(12) United States Patent
Jesionka

(10) Patent No.: US 6,515,062 B2
(45) Date of Patent: Feb. 4, 2003

(54) DECORATIVE SYNTHETIC STUCCO COMPOSITIONS

(75) Inventor: Renata Jesionka, Belle Mead, NJ (US)

(73) Assignee: Icote USA, Inc., Belle Mead, NJ (US)

( * ) Notice: Subject to any disclaimer, the term of this patent is extended or adjusted under 35 U.S.C. 154(b) by 0 days.

(21) Appl. No.: 09/805,338

(22) Filed: Mar. 13, 2001

(65) Prior Publication Data

US 2001/0056134 A1 Dec. 27, 2001

Related U.S. Application Data

(60) Provisional application No. 60/189,248, filed on Mar. 14, 2000.

(51) Int. Cl.⁷ .............................. C08L 1/26; C08K 5/10; C08K 5/05
(52) U.S. Cl. ..................... 524/447; 524/44; 524/317; 524/386; 524/432; 524/437; 524/492
(58) Field of Search .................. 524/437, 44, 317, 524/386, 447, 432, 492

(56) References Cited

U.S. PATENT DOCUMENTS

| | | |
|---|---|---|
| 4,351,912 A | 9/1982 | Jasperson |
| 4,563,491 A | 1/1986 | Comune |
| 5,558,705 A | 9/1996 | Keemer et al. |
| 5,773,492 A | 6/1998 | Ferguson |
| 5,814,686 A | 9/1998 | Micale et al. |

*Primary Examiner*—Kriellion A. Sanders
(74) *Attorney, Agent, or Firm*—Woodbridge & Associates, P.C.; Richard C. Woodbridge; Charles Manero

(57) ABSTRACT

The present invention provides decorative synthetic stucco compositions having a shiny sparkling metallic finish comprising a synthetic stucco finish coating and approximately 200 mesh aluminum metal pigment. Also provided are compositions with one or more colored metallic pigments. The present invention also provides methods for making synthetic stucco compositions having a shiny, sparkling metallic finish.

8 Claims, No Drawings

DECORATIVE SYNTHETIC STUCCO COMPOSITIONS

This application claims the benefit of U.S. Provisional application No. 60/189,248 filed Mar. 14, 2000.

BACKGROUND OF THE INVENTION

1. Field of the Invention

The instant invention relates generally to construction materials, and more particularly to stucco coating compositions and methods for preparing same.

2. Description of Related Art

Aluminum metal pigments are widely used in the coating industry to produce finishes of the type which have a metallic luster. Because pure dry aluminum metal pigments are explosive, and consequently difficult to store, they are usually supplied in stabilized form as pastes or dispersions wherein the aluminum particles are stabilized by resinous carriers or solvents. The procedure generally used to produce a colored finish with a metallic luster involves dispersing both a metallic pigment and a transparent colored pigment in a suitable vehicle. A stabilized aluminum pigment suitable for use in such a process is described in U.S. Pat. No. 5,773,492. Alternatively, colored aluminum pigments can be prepared by coating aluminum particles with a polymer matrix encapsulating a solid colorant cured thereon, and incorporating them into a dispersion. Such pigments are described in U.S. Pat. No. 5,814,686. Although the dispersions in U.S. Pat. Nos. 5,773,492 and 5,814,686 are disclosed as having utility for imparting metallic luster and color to surface coatings, their use in stucco is not taught. These dispersions have achieved wide acceptance as metallic aluminum paints, primarily in the automotive industry wherein a finish with a metallic luster is desired. A critical attribute of the aluminum metal pigment for such utilities is its fine mesh. Coarse grade aluminum metal pigments are not suitable for such uses.

A variety of synthetic stucco compositions are known in the art, each of which attempts to solve one or more problems associated with the use of conventional natural stucco materials which have been use for hundreds of years. U.S. Pat. No. 4,351,912, for example, is directed to a trowelable, light-weight, synthetic stucco composition containing a crushable, lightweight aggregate, and specifically to the protection of the lightweight aggregate from substantial particle size reduction during trowelling application by providing in the composition a non-crushable aggregate having a protective particle size. U.S. Pat. No. 4,563,491 provides a synthetic stucco which incorporates baking flour which purports to be effective against variety of adverse environmental influences, including ultraviolet radiation, humidity, salt spray, fire and thermal effects. Examples such as these illustrate the fact that the precise blend of ingredients required to produce desired attributes in a new synthetic stucco are difficult to predict, and that considerable trial and error are involved in creating a new stucco composition.

A successful new synthetic stucco must be able to "breathe" to avoid problems with blistering and condensation. The present invention provides decorative synthetic stucco compositions having a shiny sparkling metallic finish, and methods for making same. Beneficially it has been found that the use of stabilized coarse mesh aluminum metal pigment in said compositions along with the metal carrier bentonite produces synthetic stucco compositions which are able to breathe, and which have an aesthetically pleasing shiny sparkling metallic finish.

SUMMARY OF THE INVENTION

In brief, the present invention provides decorative synthetic stucco compositions having a shiny sparkling metallic finish comprising 75–100 parts by weight of a synthetic stucco finish coating and 1 part by weight of approximately 200 mesh stabilized aluminum metal pigment. Also provided are such compositions further comprising 1–20 parts per thousand by weight of a metallic pigment for coloring said compositions. Finally, the present invention also provides methods for making synthetic stucco compositions having a shiny, sparkling metallic finish.

DETAILED DESCRIPTION OF THE INVENTION

The preferred embodiment of the present invention is one wherein the synthetic stucco finish coating and the stabilized aluminum metal pigment are present in the ratio of 85–90:1, and said stabilized aluminum metal pigment is Silberline AQUASIL® BP 2750 aluminum pigment available from Silberline Manufacturing Company, Inc.

This invention also provides synthetic stucco compositions having a shiny sparkling metallic finish further comprising colored metal pigments. Metal pigments can be added, in such quantities as required to give the composition the desired color. Preferred pigments of the present invention are metal-based, more preferably belonging to the iron oxide class. Compositions having 1–20 parts per thousand by weight of one or more iron oxide based pigments are most preferred.

The synthetic stucco finish coating of the present invention can contain mineral carriers, binders, fillers, acrylic resins, and various additives such as dispersants, defoamers, coalesing agents, rheology modifiers, white pigments, preservatives such as fungicides, solvents as needed to obtain a fluid combination, and aqueous ammonia as needed to adjust the pH to 7.0–8.8.

Mineral carriers suitable for use in the compositions of this invention include, but are not limited to, bentonites such as calcium bentonite and sodium bentonite; montmorillonite clays; kaolin clays; diatomaceous earth; and talc; and mixtures thereof. Sodium bentonite is a preferred mineral carrier.

Binders suitable for use in the compositions of the present invention include, but are not limited to, cellulose based binders such as sodium carboyxmethyl cellulose, hydroxy methyl cellulose, methyl cellulose, ethyl cellulose, and the like; dextrin; starch; poly(vinyl alcohol); sodium alginate; sodium polyacrylate; and gums such as xanthan gum, welan gum, gum arabic and the like; and mixtures thereof. Ethyl hydroxyethyl cellulose is a preferred binder.

Fillers of use in the present invention include silica, volcanic sand, and ground marble. A preferred filler is silica. More preferred is silica having a mesh size substantially in the range of 35–200 mesh.

Acrylic resins of use in the present invention are acrylic latexes including polymers and copolymers containing units of acrylic acid, methacrylic acid, their esters, acrylonitrile, and styrene. A preferred acrylic resin of the present invention is a styrene/acrylate copolymer dispersion.

A variety of dispersants of use in the present invention are known in the art, and are commercially available. The preferred dispersant is maleic anhydride-isobutylene polymer sodium salt.

The preferred defoamer of use in the present invention is NOPCO®, a trade secret blend available from Henkel Corporation.

A variety of coalescing agents of use in the present invention are known in the art, and are commercially available. The preferred coalescent is coalescent 2,2,4-trimethyl-1,3-pentanediol momo(2-propionate).

Rheology modifiers of use in the present invention are acrylic resin based. The preferred rheolgy modifier is Poly-Phobe® 111 available from Union Carbide.

White pigments suitable for use in the compositions of the present invention are zinc oxide and zinc sulfide. Zinc oxide is a preferred white pigment since it adventitiously also functions as a fungicide.

The preferred embodiment of the synthetic stucco finish coating of the present invention comprises on a weight basis the binder ethyl hydroxyethyl cellulose, substantially in the range of 1.0–2.5 parts; the solvent propylene glycol, substantially in the range of 10–12 parts; the dispersant maleic anhydride-diisobutylene polymer sodium salt, substantially in the range of 1–3 parts; the defoamer NOPCO®, substantially in the range of 0.5–1.5 parts; the coalescent 2,2,4-trimethyl-1,3-pentanediol mono(2-propionate), substantially in the range of 2–4 parts; the rheology modifier PolyPhobe® 111, substantially in the range of 1–2 parts; the mineral carrier sodium bentonite, substantially in the range of 7–9 parts; the filler silica having a particle size of 200 mesh, substantially in the range of 5–7 parts; the white pigment/fungicide zinc oxide substantially in the range of 15–18 parts; the filler silica having a particle size of 35–200 mesh, substantially in the range of 600–800; the styrene/acrylate copolymer dispersion Acronal® 296, substantially in the range of 150–200 parts; water, substantially in the range of 60–90 parts as needed to obtain a fluid combination; and 25–30% aqueous ammonia, substantially in the range of 0.2–0.4 parts by weight as needed to adjust the pH to 8.4.

This invention also provides methods for making synthetic stucco compositions having a shiny sparkling metallic finish comprising the steps of a) pre-forming a synthetic finish coating; and b) mixing in approximately 200 mesh stabilized aluminum until a uniform consistency is achieved, wherein the ratio of synthetic finish coating to aluminum pigment is 75–100:1. In a preferred embodiment of the present invention, the method produces synthetic stucco compositions having a shiny sparkling metallic finish wherein the ratio of synthetic finish coating to aluminum pigment is 85–90:1

This invention provides methods for making colored synthetic stucco compositions having a shiny sparkling metallic finish further comprising the step of adding one or more colored pigments, more preferably in the iron oxide based class. A preferred embodiment of the present invention comprises adding 1–20 parts per thousand by weight of an iron oxide based colored pigment to synthetic stucco compositions having a shiny sparkling metallic finish and mixing until a uniform consistency is achieved.

In the preferred embodiment of the method for making synthetic stucco compositions having a shiny sparkling metallic finish, pre-forming of the synthetic stucco finish coating comprises the steps of a) mixing the binder ethyl hydroxyethyl cellulose substantially in the range of 1.0–2.5 parts by weight with water substantially in the range of 50–60 parts by weight with increasing speed for two hours to remove lumps, and storing the product in plastic containers; b) placing the solvent propylene glycol substantially in the range of 10–12 parts by weight, the dispersant maleic anhydride-diisobutylene polymer sodium salt substantially in the range of 1–3 parts by weight, the defoamer NOPCO® substantially in the range of 0.5–1.5 parts by weight; the coalescent 2,2,4-trimethyl-1,3-pentanediol momo(2-propionate) substantially in the range of 2–4 parts by weight, the rheology modifier PolyPhobe® 111 substantially in the range of 1–2 parts by weight, and approximately 25–30% aqueous ammonia substantially in the range of 1–2 parts by weight in a mixer, and stirring for three minutes; c) adding to the mixture from step b) water substantially in the range of 10–30 parts by weight, followed sequentially by the mineral carrier sodium bentonite substantially in the range of 7–9 parts by weight, the filler 200 mesh silica substantially in the range of 5–7 parts by weight, and the white pigment/fungicide zinc oxide substantially in the range of 15–18 parts by weight, and mixing with increasing speed for 10 minutes to remove lumps; and d) adding to the mixture of step c) the filler 35–200 mesh silica substantially in the range of 600–800? By weight, the styrene/acrylate copolymer dispersion Acronal® 296 substantially in the range of 150–200 parts by weight, and the product from step a) substantially in the range of 51.0–62.5 parts by weight and mixing with increasing speed for 5 minutes to remove lumps.

Beneficially, the compositions of the present invention provide decorative waterproofing, textured coatings for exterior and interior concrete, masonry, wood, drywall, insulation board or other similar surfaces. These compositions are preferably applied by trowel. The compositions add insulation to the surfaces covered, provide permanent protection against rain and freeze-thaw cycles, and "breathe", thus preventing condensation and blistering.

In order to facilitate a further understanding of the invention, the following examples are presented primarily for the purpose of illustrating more specific details thereof. While the invention has been described with reference to the preferred embodiments thereof, it will be appreciated by one of ordinary skill in the art that modifications can be made to the elements of the invention without departing from the spirit and scope of the invention as a whole.

EXAMPLE 1

Preparation of synthetic stucco finish coating

| Ingredient | Quantity | Description |
| --- | --- | --- |
| 1 | 1.71 lb. | Bermocoll- ethyl hydroxyethyl cellulose binder supplied by Azko Nobel as a dry powder |
| 2 | 10.95 lb. | Propylene glycol supplied by Ashland Chemical |
| 3 | 2.15 lb. | Daxad 31 ® - a dispersant supplied by Hampshire Chemical Company |
| 4 | 0.98 lb. | NOPCO ® - a defoamer supplied by Hemkel Corporation |
| 5 | 3.14 lb. | Texanol - a coalescent supplied by Eastman Chemical Products [2,2,4-trimethyl-1,3-pentanediol mono(2-propionate)] |
| 6 | 1.42 lb. | PolyPhobe ® 111 - an acrylic latex supplied by Union Carbide |
| 7 | 0.33 lb. | AquaAmmonia 27.5% - supplied by Coyne Chemical Company |
| 8 | 8.0 lb. | Sodium bentonite - a metal carrier supplied by Black Hills Bentonite Co. |
| 9 | 6.0 lb. | Minusil ® - 200 mesh silica supplied by Unimin Specialty Chemicals, Inc. |
| 10 | 16.0 lb. | Zinc oxide - a white pigment/fungicide supplied by Virginia Chemicals |
| 11 | 700 lb. | Fine Dry Silica - 35–200 mesh silica supplied by U.S. Silica |
| 12 | 167 lb. | Acronal ® 296 - a styrene/acrylate copolymer dispersion supplied by BASF Corporation |

Step 1. Ingredient 1 and 55.29 lb. of water are mixed with increasing speed for two hours in an ATLAS Variable Speed High Intensity Mixer until free of lumps, and the resulting mixture is then stored in plastic containers.

Step 2. Ingredients 2, 3, 4, 5, 6, and 7 are added to the mixer in the order specified, and mixed for three minutes.

Step 3. To the mixture of Step 2 is added 20 lb. of water followed sequentially by ingredients 8, 9, 10 and 100 lb. of ingredient 11. This is then mixed with increasing speed for 10 minutes at which point the mixture is lump free.

Step 4. To the mixture of Step 3 is added ingredient 12, 600 g of ingredient 11, and 57 lb. of the material produced in Step 1. This is mixed with increasing speed for 5 minutes until the stucco finish coat is lump free and has a uniform consistency.

EXAMPLE 2

Preparation of synthetic stucco finish coating with sparkling, shiny metallic effect 2000 grams of the stucco finish coat from Example 1 and 40 grams of Silberline AQUASIL® BP 2750 aluminum pigment are mixed for three minutes using a Hand Held Jiffy Mixer until the pigment is thoroughly dispersed.

EXAMPLE 3

Preparation of colored synthetic stucco finishes with sparkling, shiny metallic effect 1000 lbs. of synthetic stucco finish coating from Example 2, 57 grams of iron oxide yellow pigment (Mineral Pigment Corporation, Catalog No. J5180) and 58 grams of umber pigment (Mineral Pigment Corporation, Catalog No. JC428) are mixed until uniform to produce the colored synthetic stucco finish with sparkling, shiny metallic effect.

Substitution of other iron oxide pigments or pigment combinations in the procedure above provides other colored synthetic stucco finishes with sparkling, shiny metallic effect.

What is claimed is:

1. A synthetic stucco composition having a shiny sparkling metallic finish comprising:
    75–100 parts by weight of a synthetic stucco finish coating; and
    1 part by weight of approximately 200 mesh stabilized aluminum metal.

2. The composition of claim 1 wherein said synthetic stucco finish coating comprises:
    the binder ethyl hydroxyethyl cellulose substantially in the range of 1.0–2.5 parts by weight;
    the solvent propylene glycol, substantially in the range of 10–12 parts by weight;
    the dispersant maleic anhydride-diisobutylene polymer sodium salt, substantially in the range of 1–3 parts by weight;
    a petroleum based defoamer substantially in the range of 0.5–1.5 parts by weight;
    the coalescent 2,2,4-trimethyl-1,3-pentanediol mono(2-propionate), substantially in the range of 2–4 parts by weight;
    a rheology modifier, substantially in the range of 1–2 parts by weight;
    the mineral carrier sodium bentonite, substantially in the range of 7–9 parts by weight;
    the filler 200 mesh silica, substantially in the range of 5–7 parts by weight;
    the white pigment/fungicide zinc oxide, substantially in the range of 15–18 parts by weight;
    the filler 35–200 mesh silica, substantially in the range of 600–800 by weight;
    a styrene/acrylate copolymer dispersion, substantially in the range of 150–200 parts by weight;
    water, substantially in the range of 60–90 parts by weight as needed to obtain a fluid combination; and
    25–30% aqueous ammonia, substantially in the range of 0.2–0.4 parts by weight as needed to adjust the pH to 8.4.

3. The composition of claim 1 further comprising one or more iron oxide based mineral pigments in an amount of 1–20 parts per thousand.

4. The composition of claim 3 wherein said synthetic stucco finish coating comprises:
    the binder ethyl hydroxyethyl cellulose, substantially in the range of 1.0–2.5 parts by weight;
    the solvent propylene glycol substantially in the range of 10–12 parts by weight;
    the dispersant maleic anhydride-diisobutylene polymer sodium salt, substantially in the range of 1–3 parts by weight;
    a petroleum based defoamer, substantially in the range of 0.5–1.5 parts by weight;
    the coalescent 2,2,4-trimethyl-1,3-pentanediol mono(2-propionate), substantially in the range of 2–4 parts by weight;
    a rheology modifier, substantially in the range of 1–2 parts by weight;
    the mineral carrier sodium bentonite, substantially in the range of 7–9 parts by weight;
    the filler 200 mesh silica, substantially in the range of 5–7parts by weight; the white pigment/fungicide zinc oxide, substantially in the range of 15–18 parts by weight;
    the filler 35–200 mesh silica, substantially in the range of 600–800 by weight;
    a styrene/acrylate copolymer dispersion, substantially in the range of 150–200 parts by weight;
    water, substantially in the range of 60–90 parts by weight as needed to obtain a fluid combination; and
    25–30% aqueous ammonia, substantially in the range of 0.2–0.4 parts by weight as needed to adjust the pH to 8.4.

5. A method of making a synthetic stucco composition having a sparkling finish comprising the steps of:
    pre-forming a synthetic finish coating; and
    mixing in approximately 200 mesh stabilized aluminum until a uniform consistency is achieved,
    wherein the ratio of said synthetic finish coating to said aluminum is 75–100:1.

6. The method of claim 5 wherein said pre-forming of said synthetic finish coating comprises the steps of:
    a) mixing the binder ethyl hydroxyethyl cellulose substantially in the range of 1.0–2.5 parts by weight with water substantially in the range of 50–60 parts by weight with increasing speed for two hours to remove lumps, and storing in product in plastic containers;
    b) placing the solvent propylene glycol substantially in the range of 10–12 parts by weight, the dispersant maleic anhydride-diisobutylene polymer sodium salt substantially in the range of 1–3 parts by weight, a petroleum based defoamer substantially in the range of 0.5–1.5 parts by weight; the coalescent 2,2,4-trimethyl- 1,3-pentanediol mono(2-propionate) substantially in the range of 2–4 parts by weight, a rheology modifier substantially in the range of 1–2 parts by weight, and approximately 25–30% aqueous ammonia substantially in the range of 0.2–0.4 parts by weight in a mixer, and stirring for three minutes;

c) Adding to the mixture from step b) water substantially in the range of 10–30 parts by weight, followed sequentially by the mineral carrier sodium bentonite substantially in the range of 7–9 parts by weight, the filler 200 mesh silica substantially in the range of 5–7 parts by weight, and the white pigment/fungicide zinc oxide substantially in the range of 15–18 parts by weight, and mixing with increasing speed for 10 minutes to remove lumps;

d) adding to the mixture of step c) the filler 35–200 mesh silica substantially in the range of 600–800 parts by weight, a styrene/acrylate copolymer dispersion substantially in the range of 150–200 parts by weight, and the product from step a) substantially in the range of 51.0–62.5 parts by weight and mixed with increasing speed for 5 minutes to remove lumps.

7. The method of claim 5 further comprising mixing in one or more iron oxide mineral pigments substantially in the range of 1–20 parts per thousand.

8. The method of claim 7 wherein said pre-forming of said synthetic finish coating comprises the steps of:

a) mixing the binder ethyl hydroxyethyl cellulose substantially in the range of 1.0–2.5 parts by weight with water substantially in the range of 50–60 parts by weight with increasing speed for two hours to remove lumps, and storing in product in plastic containers;

b) placing the solvent propylene glycol substantially in the range of 10–12 parts by weight, the dispersant maleic anhydride-diisobutylene polymer sodium salt substantially in the range of 1–3 parts by weight, a petroleum based defoamer substantially in the range of 0.5–1.5 parts by weight; the coalescent 2,2,4-trimethyl-1,3-pentanediol mono(2-propionate) substantially in the range of 2–4 parts by weight, a rheology modifier substantially in the range of 1–2 parts by weight, and approximately 25–30% aqueous ammonia substantially in the range of 0.2–0.4 parts by weight in a mixer, and stirring for three minutes;

c) adding to the mixture from step b) water substantially in the range of 10–30 parts by weight, followed sequentially by the mineral carrier sodium bentonite substantially in the range of 7–9 parts by weight, the filler 200 mesh silica substantially in the range of 5–7 parts by weight, and the white pigment/fungicide zinc oxide substantially in the range of 15–18 parts by weight, and mixing with increasing speed for 10 minutes to remove lumps;

d) adding to the mixture of step c) the filler 35–200 mesh silica substantially in the range of 600–800 parts by weight, a styrene/acrylate copolymer dispersion substantially in the range of 150–200 parts by weight, and the product from step a) substantially in the range of 51.0–62.5 parts by weight and mixed with increasing speed for 5 minutes to remove lumps.

* * * * *